US012670382B2

(12) United States Patent
Li et al.

(10) Patent No.: US 12,670,382 B2
(45) Date of Patent: Jun. 30, 2026

(54) MONITORING OPERATOR COMPATIBILITY WITHIN A DEEP LEARNING FRAMEWORK

(71) Applicant: Beijing Baidu Netcom Science and Technology Co., Ltd., Beijing (CN)

(72) Inventors: Yamei Li, Beijing (CN); Xiang Lan, Beijing (CN); Tao Luo, Beijing (CN); Huihuang Zheng, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 1006 days.

(21) Appl. No.: 17/208,707

(22) Filed: Mar. 22, 2021

(65) Prior Publication Data
US 2021/0209114 A1 Jul. 8, 2021

(30) Foreign Application Priority Data
Sep. 25, 2020 (CN) .......................... 202011027367.4

(51) Int. Cl.
*G06N 3/08* (2023.01)
*G06N 3/04* (2023.01)
(Continued)

(52) U.S. Cl.
CPC ...................................... *G06N 3/08* (2013.01)

(58) Field of Classification Search
CPC ............ G06N 3/08; G06N 5/01; G06N 3/105; G06N 20/00; G06N 3/04; G06F 16/24537
See application file for complete search history.

(56) References Cited

U.S. PATENT DOCUMENTS 10,073,683 B2 9/2018 Prasad et al.
2005/0132346 A1* 6/2005 Tsantilis ................... G06F 8/71
717/168
(Continued)

FOREIGN PATENT DOCUMENTS

CN 201410778022.0 3/2015
CN 110515626 A 11/2019
(Continued)

OTHER PUBLICATIONS

Abadi et al., "Verifying Parallel Code After Refactoring Using Equivalence Checking" (Year: 2018).*
(Continued)

*Primary Examiner* — Kamran Afshar
*Assistant Examiner* — Steven Phung
(74) *Attorney, Agent, or Firm* — Leydig, Voit & Mayer, Ltd.

(57) ABSTRACT

A method for monitoring operator compatibility within a deep learning framework, a computing system, and a non-transitory computer-readable storage medium are provided. The present disclosure relates to the field of deep learning. The method includes: generating first description information associated with at least one original operator and second description information associated with at least one modified operator, determining differences between the first description information associated with the at least one original operator and the second description information associated with the at least one modified operator, determining whether the differences satisfy a preset rule; and prompting information about incompatibility in response to determining that at least one of the differences does not satisfy the preset rule. The first and second description information are associated with the operator compatibility.

17 Claims, 3 Drawing Sheets

(51) Int. Cl.
　　G06N 5/01　　　　(2023.01)
　　G06N 20/00　　　(2019.01)

(56)　　　　　　References Cited

U.S. PATENT DOCUMENTS

| | | | | |
|---|---|---|---|---|
| 2010/0306757 | A1* | 12/2010 | Becker | G06F 9/44536 |
| | | | | 717/170 |
| 2016/0330082 | A1 | 11/2016 | Bliss et al. | |
| 2020/0193278 | A1* | 6/2020 | Jeon | G06N 3/08 |

FOREIGN PATENT DOCUMENTS

| | | |
|---|---|---|
| CN | 201910778772.0 | 11/2019 |
| CN | 110688300 A | 1/2020 |
| CN | 201911039702.X | 2/2020 |
| CN | 111290785 A | 6/2020 |
| CN | 111538656 A | 8/2020 |
| EP | 2270655 A1 | 1/2011 |
| JP | 2004164075 A | 6/2004 |
| JP | 2015524966 A | 8/2015 |
| WO | 2009044971 A1 | 4/2009 |

OTHER PUBLICATIONS

Black, "Compare-by-Hash: A Reasoned Analysis" (Year: 2006).*
Yong et al., "Mutation test method for browser compatibility of JavaScript," Journal of Computer Applications, China Academic Journal Electronic Publishing House (Apr. 10, 2017).
Tusień, Ewa Open Neural Network Exchange (ONNX) function_ verify_test.cc at v1.7.0., github.com (Feb. 21, 2020).

* cited by examiner

MONITORING OPERATOR COMPATIBILITY WITHIN A DEEP LEARNING FRAMEWORK

CROSS REFERENCE TO RELATED APPLICATION

This application claim priority to Chinese Patent Application No. 202011027367.4, field on Sep. 25, 2020, the contents of which are hereby incorporated by reference in their entirety for all purposes.

TECHNICAL FIELD

The present disclosure relates to the field of deep learning, and more specifically, to a method and an apparatus for monitoring operator compatibility within a deep learning framework, a computing system, and a computer-readable storage medium.

BACKGROUND

Deep learning is a key technology in the field of artificial intelligence, and developers usually carry out related work based on a deep learning framework. As a basic computing unit in the deep learning framework, an operator is a mapping from one function space to another function space, and plays an important role in model training, prediction, and deployment. With the continuous development of the deep learning technologies, the number of operators in the deep learning framework is gradually increased, and the operators are in fast iteration.

SUMMARY

According to a first aspect of the present disclosure, a method for monitoring operator compatibility within a deep learning framework is provided, the method comprising: generating first description information associated with at least one original operator and second description information associated with at least one modified operator, wherein the first and second description information are associated with the operator compatibility: determining differences between the first description information associated with the at least one original operator and the second description information associated with the at least one modified operator; determining whether the differences satisfy a preset rule; and prompting information about incompatibility in response to determining that at least one of the differences does not satisfy the preset rule.

According to a second aspect of the present disclosure, an apparatus for monitoring operator compatibility within a deep learning framework is provided, the apparatus comprising: a first generation module configured to generate first description information associated with at least one original operator and second description information associated with at least one modified operator, wherein the first and second description information are associated with the operator compatibility; a first determination module configured to determine differences between the first description information associated with the at least one original operator and the second description information associated with the at least one modified operator, a second determination module configured to determine whether the differences satisfy a preset rule; and a prompt module configured to prompt information about incompatibility in response to determining that at least one of the differences does not satisfy the preset rule.

According to a third aspect of the present disclosure, a computing system is provided, comprising: a processor, and a non-transitory memory that stores a program, the program comprising instructions that, when executed by the processor, cause the processor to perform the method for monitoring operator compatibility within a deep learning framework.

According to a fourth aspect of the present disclosure, a non-transitory computer-readable storage medium storing a program is provided, the program comprising instructions that, when executed by a processor of a computing system, cause the computing system to perform the method for monitoring operator compatibility within a deep learning framework.

According to one or more embodiments of the present disclosure, forward compatibility of the deep learning framework can be ensured, so that a new version of a prediction library can be compatible with a model trained with an earlier version, thereby improving accuracy of operator compatibility.

According to another one or more embodiments of the present disclosure, operator compatibility within the deep learning framework can be monitored automatically, thereby reducing manpower required for manual review and reducing development costs.

BRIEF DESCRIPTION OF THE DRAWINGS

The drawings illustrate embodiments in some embodiments and form a part of the specification, and, together with the textual description of the specification, serve to explain the example implementations of the embodiments. The embodiments shown are merely for illustrative purposes and do not limit the scope of the claims. Throughout the drawings, the same reference numerals refer to similar but not necessarily identical elements.

DETAILED DESCRIPTION

In the present disclosure, unless otherwise stated, the terms "first", "second", etc., used to describe various elements are not intended to limit the positional relationship, timing relationship or importance relationship of these elements. These terms are only used to distinguish one component from another. In some examples, a first element and a second element may refer to the same instance of the element. In some cases, based on the contextual description, the first element and the second element may refer to different instances.

The terms used in the description of the various embodiments of the present disclosure are merely for the purpose of describing particular examples, and are not intended to limit the present disclosure. Unless otherwise clearly indicated in the context, if the number of elements is not specifically limited, there may be one or more elements. Moreover, the term "and/or" used in the present disclosure is intended to cover any and all possible combinations of the listed items.

The inventors have found that, in a development process of a deep learning framework, due to fast iteration of operators, there is a problem that modifications to an operator affect compatibility of the deep learning framework. This will cause a new version of a prediction library corresponding to the updated or modified deep learning framework to be incompatible with a model trained with an earlier version, incurring operational risks. Further, it may be required to retrain the model to match the new version of the prediction library, increasing development costs.

Moreover, if manual review is used to determine whether the modification to the operator meets compatibility requirements within the deep learning framework, manpower in the development process may be increased, a reviewer is required to have a higher operator development capability, and the accuracy of determining operator compatibility may also be reduced due to unintentional omissions of human.

In view of the above technical problems, one or more embodiments of the present disclosure provide a method and an apparatus for monitoring operator compatibility within a deep learning framework, a computing system, and a computer-readable storage medium. Various embodiments of the present disclosure are described in detail below in conjunction with the drawings.

Figure 1:
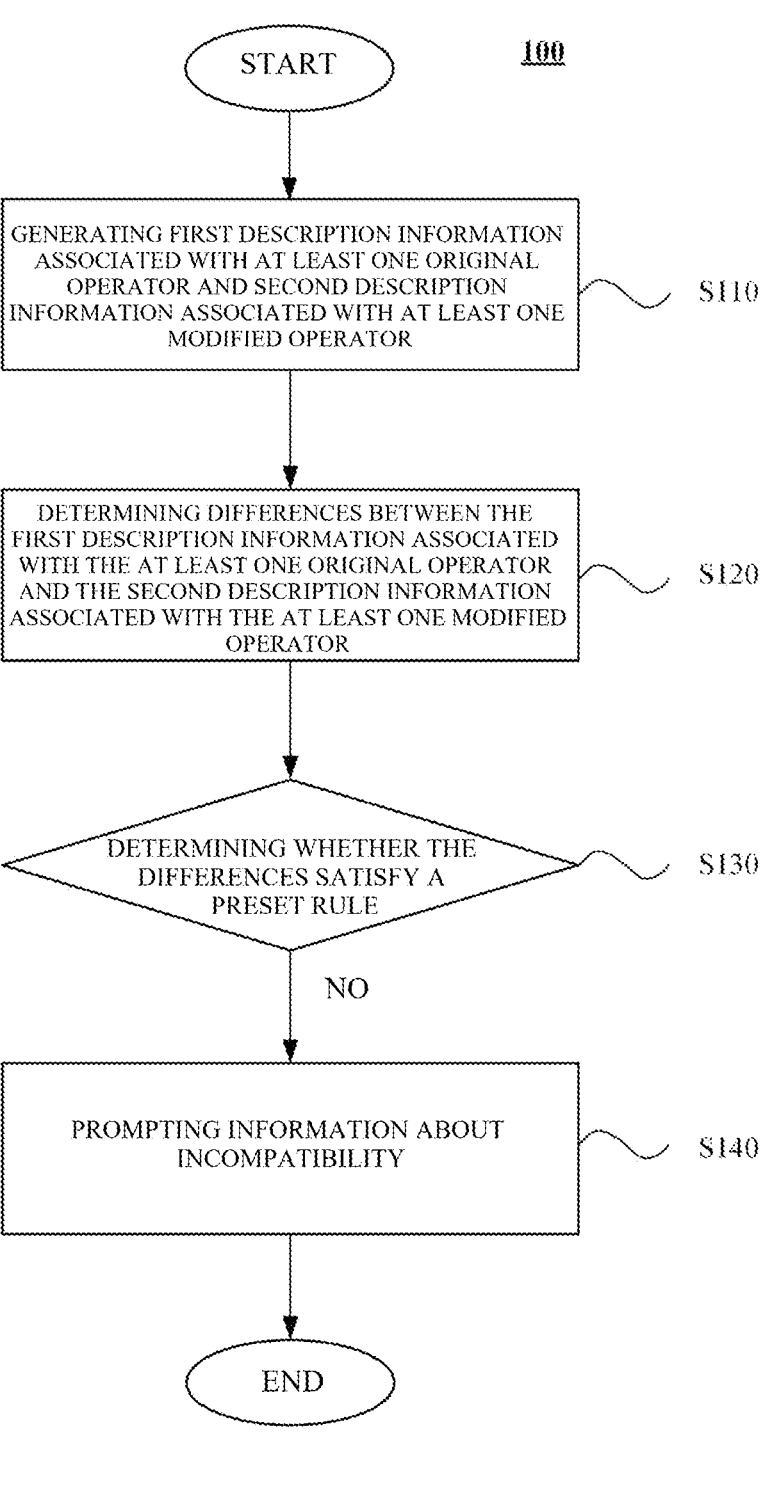
FIG. 1 is a flowchart illustrating a method for monitoring operator compatibility within a deep learning framework according to an embodiment of the present disclosure.

FIG. 1 is a flowchart illustrating a method 100 for monitoring operator compatibility within a deep learning framework according to an embodiment of the present disclosure. As shown in FIG. 1, the method 100 may comprise: step S110: generating first description information associated with at least one original operator and second description information associated with at least one modified operator, wherein the first and second description information are associated with the operator compatibility; step S120: determining differences between the first description information associated with the at least one original operator and the second description information associated with the at least one modified operator, step S130: determining whether the differences satisfy a preset rule; and step S140: prompting information about incompatibility in response to determining that at least one of the differences does not satisfy the preset rule.

According to the method for monitoring the operator compatibility within the deep learning framework according to the embodiment of the present disclosure, forward compatibility of the deep learning framework can be ensured, so that a new version of a prediction library corresponding to the updated or modified deep learning framework can be compatible with a model trained with an earlier version, thereby avoiding risks in time, saving time for retraining the model, and saving storage space for storing the new model. In addition, according to the method, manpower required for manual review can be further reduced, thereby reducing development costs.

According to some embodiments, the first and second description information associated with the operator compatibility may comprise: an input, an output, and an attribute of an operator. According to the parameters for a training scenario, each operator may have a plurality of inputs, outputs, and attributes, wherein each input, output, and attribute has a corresponding name, so that the plurality of inputs, outputs, and attributes can be distinguished. In addition to the description information associated with the operator compatibility, the operator may further have a corresponding operator name, so as to distinguish between different operators. In addition, a mapping relationship between the operator name and the description information may be formed, so as to implement a quick search for the description information.

In some examples, as shown in Table 1 below, each input and each output may have three features: "replicable". "intermediate variable", and "dispensable", and a feature value "true" or "false" may be set for the above features. When the feature value of the feature "replicable" is "true", it indicates that the corresponding input/output is an array, and when the feature value of the feature "replicable" is "false", it indicates that the corresponding input/output is not an array (for example, is a single value). When the feature value of the feature "intermediate variable" is "true", it indicates that the corresponding input/output is an intermediate variable (for example, a variable generated in an internal operation process of each operator), and when the feature value of the feature "intermediate variable" is "false", it indicates that the corresponding input/output is not an intermediate variable. When the feature value of the feature "dispensable" is "true", it indicates that the corresponding input/output may not be used in an operation process of an operator, and when the feature value of the feature "dispensable" is "false", it indicates that the corresponding input/output is used to implement the operation process of the operator. In addition, each attribute may have a feature "default value", and for the feature "default value", an arbitrary value that meets the parameters for a training scenario may be set as a feature value.

TABLE 1

| Description information | Feature | Feature value |
|---|---|---|
| Input | Replicable | True/False |
| | Intermediate variable | True/False |
| | Dispensable | True/False |
| Output | Replicable | True/False |
| | Intermediate variable | True/False |
| | Dispensable | True/False |
| Attribute | Default value | Arbitrary value |

It should be noted that the description information, features and the corresponding feature values listed in Table 1 are only for illustrative purposes. The description information may further comprise other information associated with operator compatibility. The input output, and attribute of the operator may further have other features. The feature values are not limited to "true". "false", or "arbitrary value" listed in the table above. Any value that can indicate the meaning of the corresponding description information is feasible, including but not limited to numbers (for example, "0" and "1") or text ("array"/"non-array", "intermediate variable"/ "non-intermediate variable", "dispensable"/"indispensable", etc.).

According to some embodiments, the first and second description information may be stored in at least one of a dictionary, a table, or an array, so as to invoke associated description information more conveniently. The dictionary, the table (such as a hash table), or the array may store one or more pieces of description information associated with the operator. For example, the description information of all modified operators may be stored in one dictionary, table, or array. Due to the same storage space, the time of accessing and invoking description information may be saved.

It should be understood that the description information is not limited to be stored in the dictionary, table, or array listed above, but may be stored in any software or hardware with a storage function or a combination thereof.

According to some embodiments, generating the description information associated with the operator may comprise performing the following operations in a programming language environment such as Python, Matlab/Simulink, and C/C++: acquiring at least one operator and the operator name thereof; acquiring, according to the operator name, the description information associated with compatibility, including the input, the output, the attribute, etc.; and generating a set of the description information. Step S110 of generating description information associated with at least one original operator and description information associated with at least one modified operator may be implemented by using the method above.

The description information associated with the operator can be quickly and automatically generated by using the programming language environment. This avoids manually inputting the description information associated with the operator to a storage environment such as a dictionary, a table, or an array, thereby saving required manpower and time.

According to some embodiments, step S120 of determining differences between the description information associated with the at least one original operator and that associated with the at least one modified operator may comprise for example: searching for differences between inputs, outputs, and attributes in two pieces of description information one by one according to the operator name, wherein the input and output may comprise the above features "replicable", "intermediate variable", and "dispensable", and the attribute may comprise the above feature "default value"; and outputting the operator name and the differences between the pieces of description information associated with that operator name. For example, features "replicable", "intermediate variable", and "dispensable" in, for example, the input of an original operator A are compared with features "replicable", "intermediate variable", and "dispensable" in, for example, the input of the modified operator A one by one. If the features are the same, other description information of the original operator A continues to be compared with other description information of the modified operator A, until comparison of all description information between the original operator A and the modified operator A is completed; and if the features are different, the operator name "A" of the operator A and the differences (for example, at least one of the features "replicable". "intermediate variable", and "dispensable" in the input or output and the feature "default value" in the attribute) in the description information are extracted.

According to some embodiments, after step S120, in step S130, the differences in the description information may be compared with the preset rule, so as to determine whether the differences satisfy the preset rule. The preset rule may comprise: a rule for determining whether the at least one modified operator is compatible within the deep learning framework.

In some examples, the preset rule may comprise: for the input in description information of an operator, if the input of the operator is added, the feature "dispensable" in the newly added input is assigned a feature value "true" to indicate that the newly added input is dispensable, and it is determined that the modified operator is compatible within the deep learning framework; if the input of the operator is deleted, it is determined that the modified operator is incompatible within the deep learning framework; and if the feature value of the feature in the input of the operator is modified (for example, the feature value of the feature "replicable" in the input of the operator is modified from "true" to "false", the feature value of the feature "intermediate variable" is modified from "false" to "true", and the feature value of the feature "dispensable" is modified from "true" to "false"), it is determined that the modified operator is incompatible within the deep learning framework.

In other examples, the preset rule may comprise a rule that is set for the output in the description information of the operator, which is similar to the rule that is set for the input in the description information of the operator. Therefore, details are not repeated herein.

In some other examples, the preset rule may comprise: for the attribute in description information of an operator, if the attribute of the operator is added, a feature value is set for the feature "default value" in the newly added attribute, and it is determined that the modified operator is compatible within the deep learning framework; if the attribute of the operator is deleted, it is determined that the modified operator is incompatible within the deep learning framework; and if the feature value of the feature "default value" in the attribute of the operator is modified (for example, the feature value of the feature "default value" is modified from "0" to "1"), it is determined that the modified operator is incompatible within the deep learning framework.

In still some other examples, the preset rule may comprise: for a newly added operator (for example, when an original operator matching a modified operator cannot be found through the step S120, it is determined that the modified operator is a newly added operator), it is determined that the modified operator is compatible within the deep learning framework.

It should be understood that, various preset rules in the above examples may also be combined in any appropriate manner for use. In addition, other rules for determining whether the modified operator is compatible within the deep learning framework may be set according to the parameters for different application scenarios (for example, different deep learning frameworks, different training scenarios, etc.), and are not limited to those listed in the above examples. Therefore, while operator compatibility within the deep learning framework is ensured, available application scenarios can be enriched, which is further suitable for different model training, prediction, and deployment.

According to some embodiments, step S140 of prompting information about incompatibility in response to determining that at least one of the differences does not satisfy the preset rule may comprise: based on determining one of the differences that does not satisfy the preset rule, continuing to determine whether the remaining differences satisfy the preset rule, and prompting the information about incompatibility; or based on determining one of the differences that does not satisfy the preset rule, forgoing determining whether the remaining differences satisfy the preset rule, and prompting the information about incompatibility.

According to some embodiments, the information about incompatibility may comprise: information about at least one of the differences that does not satisfy the preset rule; and information about a modified operator associated with the at least one of the differences.

After it is determined that there is one difference that does not satisfy the preset rule, by continuing to determine whether the remaining differences satisfy the preset rule, and then prompting the information about incompatibility, all differences that do not satisfy the preset rule can be determined at a time, thereby reducing frequency and time for performing the method for monitoring operator compatibility, and storage space occupied by the data generated after each performance of the method.

In some examples, description information of an original operator A, an original operator B, and an original operator C and description information of the modified operator A, the modified operator B, and the modified operator C are generated in step S110. In step S120, it is determined that, for example, a new input is added to the operator A, an output is deleted from the operator B, and a new attribute is added to the operator C. In steps S130 and S140, when it is determined that, for example, the feature "dispensable" in the newly added input of the operator A is assigned the feature value "false", it is determined that the modified operator A is incompatible within the deep learning framework, and whether modifications to the operator B and the operator C satisfy the preset rule continues to be determined. For example, since the output of the operator B is deleted, it may be determined that the preset rule is not met, and therefore, it is determined that the modified operator B is also incompatible within the deep learning framework. Further, since a certain feature value (for example, "10") is set for the feature "default value" in the newly added attribute of the operator C, it may be determined that the preset rule is met, and therefore, it is determined that the modified operator C is compatible within the deep learning framework. Such a determination is performed until all of the differences are determined whether to satisfy the preset rule. Then, information about an incompatible modified operator may be prompted, for example, the operator name (i.e., the operator A and the operator B in this example), and the difference that does not satisfy the preset rule (i.e., the newly added input of the operator A and the deleted output of the operator B in this example).

After it is determined that there is one difference that does not satisfy the preset rule, by forgoing determining whether the remaining differences satisfy the preset rule, and then prompting information about incompatibility, the difference indicates the incompatibility can be more quickly and intuitively located, so that developers can review it in time.

Continuing the above example, in steps S130 and S140, when it is determined that, for example, the feature "dispensable" in the newly added input of the operator A is assigned the feature value "false", it is determined that the modified operator A is incompatible within the deep learning framework, and information about the incompatible modified operator is prompted, for example, the operator name (i.e., the operator A in this example), and the difference that does not satisfy the preset rule (i.e., the newly added input of the operator A in this example). Then, after the incompatibility problem caused by the modified operator A is solved based on the information about incompatibility, whether modifications to the operator B and the operator C satisfy the preset rule is continued to be determined in the same way.

Figure 2:
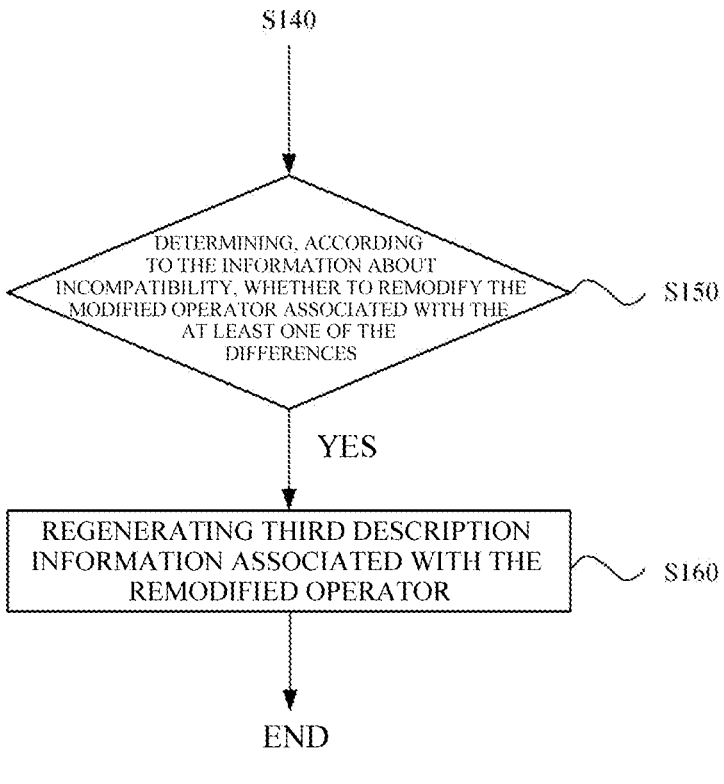
FIG. 2 is a flowchart illustrating a method for monitoring operator compatibility within a deep learning framework according to another embodiment of the present disclosure.

FIG. 2 is a flowchart illustrating a method 200 for monitoring operator compatibility within a deep learning framework according to another embodiment of the present disclosure. According to some embodiments, as shown in FIG. 2, the method 200 may further comprise: step S150 (which is performed after step S140): determining, according to the information about incompatibility, whether to remodify the modified operator associated with the at least one of the differences; and step S160: regenerating, in response to determining to remodify the modified operator associated with the at least one of the differences, third description information associated with the remodified operator.

By remodifying the incompatible operator and regenerating the description information associated with the remodified operator, it is possible to monitor again whether the remodified operator is compatible (for example, through steps S110 to S140 in the method 100), which further ensures forward compatibility of the deep learning framework.

Figure 3:
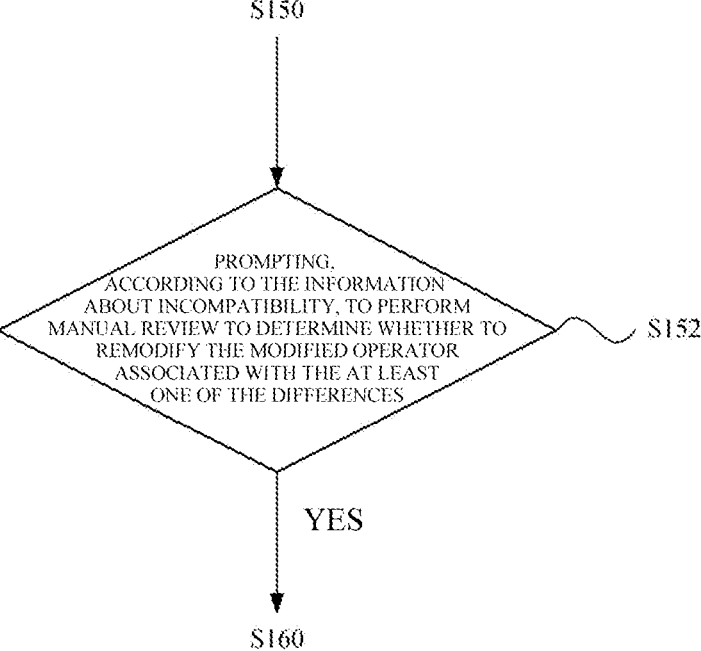
FIG. 3 is a flowchart illustrating determining, according to information about incompatibility, whether to remodify a modified operator associated with at least one of differences according to an embodiment of the present disclosure.

FIG. 3 is a flowchart illustrating determining, according to information about incompatibility, whether to remodify a modified operator associated with at least one of differences according to an embodiment of the present disclosure.

According to some embodiments, as shown in FIG. 3, step S150 of determining, according to the information about incompatibility, whether to remodify the modified operator associated with the at least one of the differences may comprise: step S152: prompting, according to the information about incompatibility, to perform manual review to determine whether to remodify the modified operator associated with the at least one of the differences.

By prompting to perform manual review to determine whether to remodify the incompatible modified operator, the accuracy of the method for monitoring operator compatibility within the deep learning framework can be further improved. This is advantageous in the cases of, for example, deleting description information associated with the operator and modifying the feature value of the feature in the description information associated with the operator.

In some examples, during the development of the deep learning framework, when an operator is modified due to excessively out-of-date description information of that operator in a deep learning framework corresponding to an earlier version of a prediction library (for example, when one of outputs of an operator is no longer needed, or a correct prediction result can still be obtained when the feature "default value" of one of attributes of an operator is modified), information about incompatibility may be prompted according to the above-described preset rule. In this case, manual review may be prompted to determine which of the following reasons causes the incompatibility of the modified operator: modification of the description information of the operator may be used to improve the performance and operating efficiency of the operator, so that the operator is suitable for various application scenarios; or during a modification process, a modification is caused due to not knowing the compatibility rules within the deep learning framework or a false operation. In the former case, after manual review is prompted, it may be manually confirmed that there is no need to remodify the incompatible operator, and then the process of monitoring the operator compatibility is finished. In the latter case, after manual review is prompted, it may be manually confirmed that the incompatible operator needs to be remodified, and then for example, description information associated with the remodified operator is regenerated, so as to monitor and determine again whether the remodified operator is compatible.

Figure 4:
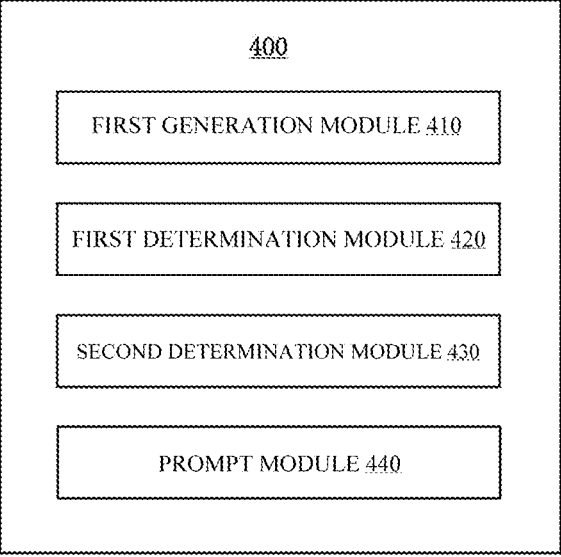
FIG. 4 is a block diagram illustrating an apparatus for monitoring operator compatibility within a deep learning framework according to an embodiment of the present disclosure.

FIG. 4 is a block diagram illustrating an apparatus 400 for monitoring operator compatibility within a deep learning framework according to an embodiment of the present disclosure. According to some embodiments, as shown in FIG. 4, the apparatus 400 may comprise: a first generation module 410 configured to generate first description information associated with at least one original operator and second description information associated with at least one modified operator, wherein the first and second description information are associated with the operator compatibility; a first determination module 420 configured to determine differences between the first description information associated with the at least one original operator and the second description information associated with the at least one modified operator; a second determination module 430 configured to determine whether the differences satisfy a preset rule; and a prompt module 440 configured to prompt information about incompatibility in response to determining that at least one of the differences does not satisfy the preset rule.

According to some embodiments, the first and second description information may comprise: an input, an output, and an attribute of an operator.

According to some embodiments, the first and second description information may be stored in at least one of a dictionary, a table, or an array.

According to some embodiments, the preset rule may comprise: a rule for determining whether the at least one modified operator is compatible within the deep learning framework.

According to some embodiments, the prompt module 440 may comprise: a first prompt submodule configured to: based on determining one of the differences that does not satisfy the preset rule, continue to determine whether the remaining differences satisfy the preset rule, and prompt the information about incompatibility; or a second prompt submodule configured to: based on determining one of the differences that does not satisfy the preset rule, forgo determining whether the remaining differences satisfy the preset rule, and prompt the information about incompatibility.

According to some embodiments, the information about incompatibility may comprise: information about at least one of the differences that does not satisfy the preset rule; and information about a modified operator associated with the at least one of the differences.

According to some embodiments, the apparatus 400 for monitoring operator compatibility within a deep learning framework may further comprise: a third determination module configured to determine, according to the information about incompatibility, whether to remodify the modified operator associated with the at least one of the differences; and a second generation module configured to regenerate, in response to determining to remodify the modified operator associated with the at least one of the differences, third description information associated with the remodified operator.

According to some embodiments, the third determination module may comprise: a module configured to prompt, according to the information about incompatibility, to perform manual review to determine whether to remodify the modified operator associated with the at least one of the differences.

In the various embodiments described above, for exemplary implementations and technical effects of the apparatus 400 and its corresponding functional modules, reference can be made to the related description in the embodiments corresponding to FIGS. 1-3. Therefore, details are not repeated herein.

According to another aspect of the present disclosure, a computing system is further provided, and may comprise: a processor; and a non-transitory memory that stores a program, the program comprising instructions that, when executed by the processor, cause the processor to perform the above method for monitoring operator compatibility within the deep learning framework.

According to yet another aspect of the present disclosure, a non-transitory computer-readable storage medium storing a program is further provided, the program comprising instructions that, when executed by a processor of a computing system, cause the computing system to perform the method for monitoring operator compatibility within the deep learning framework.

Figure 5:
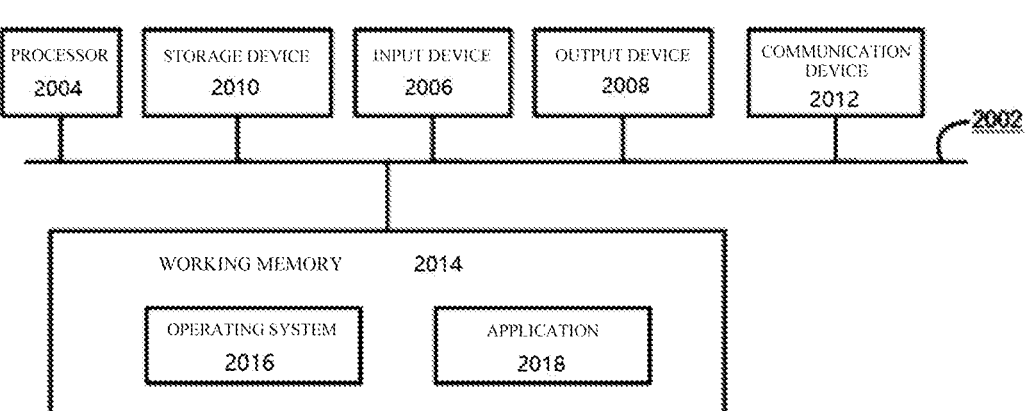
FIG. 5 is a block diagram illustrating an example computing system that can be used to implement an embodiment of the present disclosure.

Examples of such a computing system and a computer-readable storage medium will be described below in conjunction with FIG. 5. FIG. 5 is a block diagram illustrating an example computing system 2000 that can be used to implement an embodiment of the present disclosure.

The computing system 2000 is an example of a hardware device that can be applied to various aspects of the present disclosure. The computing system 2000 may be any machine configured to perform processing and/or computation, which may be, but is not limited to, a workstation, a server, a desktop computer, a laptop computer, a tablet computer, a personal digital assistant, a robot, a smartphone, an onboard computer, or any combination thereof. The foregoing method for monitoring operator compatibility within a deep learning framework may be implemented, in whole or at least in part, by the computing system 2000 or a similar device or system.

The computing system 2000 may comprise elements in connection with a bus 2002 or in communication with the bus 2002 (possibly via one or more interfaces). For example, the computing system 2000 may comprise the bus 2002, one or more processors 2004, one or more input devices 2006, and one or more output devices 2008. The one or more processors 2004 may be any type of processors and may include, but are not limited to, one or more general purpose processors and/or one or more dedicated processors (e.g., special processing chips). The input device 2006 may be any type of device capable of inputting information to the computing system 2000, and may include, but is not limited to, a mouse, a keyboard, a touchscreen, a microphone, and/or a remote controller. The output device 2008 may be any type of device capable of presenting information, and may include, but is not limited to, a display, a speaker, a video/audio output terminal, a vibrator, and/or a printer. The computing system 2000 may further comprise a non-transitory storage device 2010 or be connected to the non-transitory storage device 2010. The non-transitory storage device may be non-transitory and may be any storage device capable of implementing data storage, and may include, but is not limited to, a disk drive, an optical storage device, a solid-state memory, a floppy disk, a flexible disk, a hard disk, a magnetic tape or any other magnetic medium, an optical disc or any other optical medium, a read-only memory (ROM), a random access memory (RAM), a cache memory and/or any other memory chip or cartridge, and/or any other medium from which a computer can read data, instructions and/or code. The non-transitory storage device 2010 can be removed from an interface. The non-transitory storage device 2010 may have data/programs (including instructions)/code for implementing the foregoing methods and steps. The computing system 2000 may further comprise a communication device 2012. The communication device 2012 may be any type of device or system that enables communication with an external device and/or network, and may include, but is not limited to, a modem, a network card, an infrared communication device, a wireless communication device and/or a chipset, e.g., a Bluetooth™ device, a 1302.11 device, a Wi-Fi device, a WiMax device, a cellular communication device and/or the like.

The computing system 2000 may further comprise a working memory 2014, which may be any type of working memory that stores programs (including instructions) and/or data useful for the working of the processor 2004, and may include, but is not limited to, a random access memory and/or a read-only memory.

Software elements (programs) may be located in the working memory 2014, and may include, but is not limited to, an operating system 2016, one or more applications 2018, drivers, and/or other data and code. Instructions for performing the foregoing methods and steps may be included in one or more applications 2018, and the foregoing method for monitoring operator compatibility within a deep learning framework may be implemented by the processor 2004 by reading and executing instructions of the one or more applications 2018. More specifically, in the foregoing method for monitoring operator compatibility within a deep learning framework, steps S110-S140 may be implemented, for example, by the processor 2004 by executing an application 2018 with instructions for steps S110-S140. Moreover, in the foregoing method for monitoring operator compatibility within a deep learning framework, other steps may be implemented, for example, by the processor 2004 by executing an application 2018 with instructions for the corresponding steps. Executable code or source code of the instructions of the software elements (programs) may be stored in a non-transitory computer-readable storage medium (e.g., the storage device 2010), and may be stored in the working memory 2014 when executed (may be compiled and/or installed). The executable code or source code of the instructions of the software elements (programs) may also be downloaded from a remote location.

It should be further understood that various variations may be made based on different circumstances. For example, tailored hardware may also be used, and/or specific elements may be implemented in hardware, software, firmware, middleware, microcode, hardware description languages, or any combination thereof. For example, some or all of the disclosed methods and devices may be implemented by programming hardware (for example, a programmable logic circuit including a field programmable gate array (FPGA) and/or a programmable logic array (PLA)) with an assembly language or a hardware programming language (such as VERILOG, VHDL, and C++) by using the logic and algorithm in accordance with the present disclosure.

It should be further understood that the foregoing methods may be implemented in a server-client mode. For example, the client may receive data input by a user and send the data to the server. Alternatively, the client may receive data input by the user, perform a part of processing in the foregoing method, and send data obtained after the processing to the server. The server may receive the data from the client, perform the foregoing method or another part of the foregoing method, and return an execution result to the client. The client may receive the execution result of the method from the server, and may present it to the user, for example, through an output device.

It should be further understood that the components of the computing system 2000 may be distributed over a network. For example, some processing may be executed by one processor while other processing may be executed by another processor away from the one processor. Other components of the computing system 2000 may also be similarly distributed. As such, the computing system 2000 can be interpreted as a distributed computing system that performs processing at a plurality of locations.

Although the embodiments or examples of the present disclosure have been described with reference to the drawings, it should be understood that the methods, systems and devices described above are merely example embodiments or examples, and the scope of the present invention is not limited by the embodiments or examples, but defined by the granted claims and equivalent scopes thereof. Various elements in the embodiments or examples may be omitted or replaced with equivalent elements thereof. Moreover, various steps may be performed in an order different from that described in the present disclosure. Further, various elements in the embodiments or examples may be combined in various ways. It is important that, as the technology evolves, many elements described herein may be replaced with equivalent elements that appear after the present disclosure.

The invention claimed is:

1. A method for monitoring operator compatibility within a deep learning framework, comprising:

accessing, by a processor in an electronic device, in a programming language environment and using a hash function, at least one original operator and its respective name, at least one modified operator and its respective name, first description information associated with the at least one original operator, and second description information associated with the at least one modified operator from a same storage space, wherein the first description information and the second description information are both associated with the operator compatibility;

determining, by the processor, differences between the first description information associated with the at least one original operator and the second description information associated with the at least one modified operator;

determining, by the processor, whether the differences satisfy a preset rule;

in response to determining that at least one of the differences does not satisfy the preset rule, automatically prompting, by the processor, information that the at least one modified operator is incompatible with the deep learning framework;

determining, by the processor, after prompting the information that the at least one modified operator is incompatible with the deep learning framework, whether to remodify the at least one modified operator associated with the at least one of the differences;

in response to determining to remodify the at least one modified operator associated with the at least one of the differences, generating, by the processor, a remodified operator and generating, by the processor, in the programming language environment and using the hash function, third description information associated with the remodified operator to be stored in the same storage space for being accessed using the hash function to determine whether the remodified operator is compatible with the deep learning framework; and in response to determining not to remodify the at least one modified operator associated with the at least one of the differences, changing, by the processor, the information that the at least one modified operator is incompatible with the deep learning framework to that the at least one modified operator is compatible with the deep learning framework.

2. The method according to claim 1, wherein the preset rule comprises: a rule for determining whether the at least one modified operator is compatible within the deep learning framework.

3. The method according to claim 1, wherein in response to determining that at least one of the differences does not satisfy the preset rule, automatically prompting information that the at least one modified operator is incompatible with the deep learning framework comprises:

based on determining one of the differences that does not satisfy the preset rule, continuing to determine whether the remaining differences satisfy the preset rule, and prompting the information that the at least one modified operator is incompatible with the deep learning framework; or based on determining one of the differences that does not satisfy the preset rule, forgoing determining whether the remaining differences satisfy the preset rule, and prompting the information that the at least one modified operator is incompatible with the deep learning framework.

4. The method according to claim 1, wherein the information that the at least one modified operator is incompatible with the deep learning framework comprises:

information about at least one of the differences that does not satisfy the preset rule; and information about a modified operator associated with the at least one of the differences.

5. The method according to claim 1, wherein determining, after prompting the information that the at least one modified operator is incompatible with the deep learning framework, whether to remodify the at least one modified operator associated with the at least one of the differences comprises:

prompting, according to the information that the at least one modified operator is incompatible with the deep learning framework, to perform manual review to determine whether to remodify the at least one modified operator associated with the at least one of the differences.

6. The method according to claim 1, wherein the first and second description information comprise: an input, an output, and an attribute of an operator.

7. The method according to claim 1, wherein the first and second description information are stored in at least one of a dictionary, a table, or an array.

8. A computing system, comprising:

a processor; and a non-transitory memory that stores a program, the program comprising instructions that, when executed by the processor, cause the processor to:

access, in a programming language environment and using a hash function, at least one original operator and its respective name, at least one modified operator and its respective name, first description information associated with the at least one original operator, and second description information associated with the at least one modified operator from a same storage space, wherein the first description information and the second description information are both associated with the operator compatibility;

determine differences between the first description information associated with the at least one original operator and the second description information associated with the at least one modified operator;

determine whether the differences satisfy a preset rule;

in response to determining that at least one of the differences does not satisfy the preset rule, automatically prompt information that the at least one modified operator is incompatible with the deep learning framework;

determine, after prompting the information that the at least one modified operator is incompatible with the deep learning framework, whether to remodify the at least one modified operator associated with the at least one of the differences;

in response to determining to remodify the at least one modified operator associated with the at least one of the differences, generate a remodified operator and generate, in the programming language environment and using the hash function, third description information associated with the remodified operator to be stored in the same storage space for being accessed using the hash function to determine whether the remodified operator is compatible with the deep learning framework; and in response to determining not to remodify the at least one modified operator associated with the at least one of the differences, change the information that the at least one modified operator is incompatible with the deep learning framework to that the at least one modified operator is compatible with the deep learning framework.

9. The computing system according to claim 8, wherein the preset rule comprises: a rule for determining whether the at least one modified operator is compatible within the deep learning framework.

10. The computing system according to claim 8, wherein in response to determining that at least one of the differences does not satisfy the preset rule, automatically prompting information that the at least one modified operator is incompatible with the deep learning framework comprises:

based on determining one of the differences that does not satisfy the preset rule, continuing to determine whether the remaining differences satisfy the preset rule, and prompting the information that the at least one modified operator is incompatible with the deep learning framework; or based on determining one of the differences that does not satisfy the preset rule, forgoing determining whether the remaining differences satisfy the preset rule, and prompting the information that the at least one modified operator is incompatible with the deep learning framework.

11. The computing system according to claim 8, wherein the information that the at least one modified operator is incompatible with the deep learning framework comprises:

information about at least one of the differences that does not satisfy the preset rule; and information about a modified operator associated with the at least one of the differences.

12. The computing system according to claim 8, wherein determining, after prompting the information that the at least one modified operator is incompatible with the deep learning framework, whether to remodify the at least one modified operator associated with the at least one of the differences comprises:

prompting, according to the information that the at least one modified operator is incompatible with the deep learning framework, to perform manual review to determine whether to remodify the at least one modified operator associated with the at least one of the differences.

13. The computing system according to claim 8, wherein the first and second description information comprise: an input, an output, and an attribute of an operator.

14. The computing system according to claim 8, wherein the first and second description information are stored in at least one of a dictionary, a table, or an array.

15. A non-transitory computer-readable storage medium storing a program, the program comprising instructions that, when executed by a processor of a computing system, cause the computing system to:

access, in a programming language environment and using a hash function, at least one original operator and its respective name, at least one modified operator and its respective name, first description information associated with the at least one original operator, and second description information associated with the at least one modified operator from a same storage space, wherein the first description information and the second description information are both associated with the operator compatibility;

determine differences between the first description information associated with the at least one original operator and the second description information associated with the at least one modified operator;

determine whether the differences satisfy a preset rule;

in response to determining that at least one of the differences does not satisfy the preset rule, automatically prompt information that the at least one modified operator is incompatible with the deep learning framework;

determine, after prompting the information that the at least one modified operator is incompatible with the deep learning framework, whether to remodify the at least one modified operator associated with the at least one of the differences;

in response to determining to remodify the at least one modified operator associated with the at least one of the differences, generate a remodified operator and generate, in the programming language environment and using the hash function, third description information associated with the remodified operator to be stored in the same storage space for being accessed using the hash function to determine whether the remodified operator is compatible with the deep learning framework; and in response to determining not to remodify the at least one modified operator associated with the at least one of the differences, change the information that the at least one modified operator is incompatible with the deep learning framework to that the at least one modified operator is compatible with the deep learning framework.

16. The non-transitory computer-readable storage medium according to claim 15, wherein in response to determining that at least one of the differences does not satisfy the preset rule, automatically prompting information that the at least one modified operator is incompatible with the deep learning framework comprises:

based on determining one of the differences that does not satisfy the preset rule, continuing to determine whether the remaining differences satisfy the preset rule, and prompting the information that the at least one modified operator is incompatible with the deep learning framework; or based on determining one of the differences that does not satisfy the preset rule, forgoing determining whether the remaining differences satisfy the preset rule, and prompting the information that the at least one modified operator is incompatible with the deep learning framework.

17. The non-transitory computer-readable storage medium according to claim 15, wherein the information that the at least one modified operator is incompatible with the deep learning framework comprises:

information about at least one of the differences that does not satisfy the preset rule; and information about a modified operator associated with the at least one of the differences.

* * * * *